(12) United States Patent
Steinmaier et al.

(10) Patent No.: US 9,365,293 B2
(45) Date of Patent: Jun. 14, 2016

(54) AIR-CONDITIONING SYSTEM WITH A REDUNDANT FEED OF SUPPLY AIR

(75) Inventors: Frank Steinmaier, Ellhofen (DE); Norbert Maidhof, Heimenkirch (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 1762 days.

(21) Appl. No.: 11/804,604

(22) Filed: May 17, 2007

(65) Prior Publication Data

US 2008/0242209 A1 Oct. 2, 2008

(30) Foreign Application Priority Data

May 18, 2006 (DE) .......................... 10 2006 023 444

(51) Int. Cl.
*B64D 13/00* (2006.01)
*B64D 13/06* (2006.01)

(52) U.S. Cl.
CPC ........ *B64D 13/00* (2013.01); *B64D 2013/0618* (2013.01); *Y02T 50/56* (2013.01)

(58) Field of Classification Search
USPC ........ 454/70, 71, 72, 73, 74, 75, 76; 165/234, 165/235; 244/59, 118.5, 155 R; 62/401, 62/402, 239
See application file for complete search history.

(56) References Cited

U.S. PATENT DOCUMENTS

| | | | | |
|---|---|---|---|---|
| 3,403,852 A * | 10/1968 | Gorchev | ............... | F24F 3/0522 137/80 |
| 4,779,644 A * | 10/1988 | Benson | ................. | B64D 13/00 137/606 |
| 4,887,214 A * | 12/1989 | Takats et al. | ...................... | 701/3 |
| 5,511,385 A * | 4/1996 | Drew et al. | ..................... | 62/172 |
| 6,389,826 B2 * | 5/2002 | Buchholz et al. | ............... | 62/172 |
| 6,981,388 B2 * | 1/2006 | Brutscher et al. | ............... | 62/401 |
| 7,264,017 B2 * | 9/2007 | Denike et al. | ................. | 137/495 |
| 7,305,842 B1 * | 12/2007 | Schiff | ............... | 62/244 |
| 8,087,255 B2 | 1/2012 | Klimpel | | |
| 2004/0177639 A1 | 9/2004 | Army, Jr. et al. | | |
| 2005/0011217 A1* | 1/2005 | Brutscher et al. | ............... | 62/402 |
| 2005/0188716 A1* | 9/2005 | Brutscher et al. | ............... | 62/402 |
| 2005/0227605 A1* | 10/2005 | Whitney | ................ | B64D 13/02 454/73 |
| 2007/0113579 A1* | 5/2007 | Claeys et al. | ................... | 62/401 |
| 2007/0256558 A1* | 11/2007 | Schwalm | .......................... | 95/45 |

FOREIGN PATENT DOCUMENTS

| | | | |
|---|---|---|---|
| DE | 3240274 A1 * | 5/1984 | |
| DE | 3900987 A * | 7/1990 | |
| DE | 10301465 A1 | 8/2004 | |
| DE | 10350541 A1 | 6/2005 | |
| DE | 102006016541 A1 | 10/2007 | |
| WO | 9620109 A1 | 7/1996 | |
| WO | 0037313 A1 | 6/2000 | |
| WO | WO 2006015858 A1 * | 2/2006 | |

OTHER PUBLICATIONS

DE3900987A Translation.*

* cited by examiner

*Primary Examiner* — Alissa Tompkins
*Assistant Examiner* — Brittany Towns
(74) *Attorney, Agent, or Firm* — Alleman Hall McCoy Russell & Tuttle LLP

(57) ABSTRACT

The invention relates to an air-conditioning system with a redundant feed of supply air comprising at least one pack which is supplied with air, with at least one valve being arranged in the feed for the air flow control. In accordance with the invention, an electrical flow control valve and a pneumatic flow control valve are arranged in parallel connection in front of the pack for the air flow control.

13 Claims, 2 Drawing Sheets

AIR-CONDITIONING SYSTEM WITH A REDUNDANT FEED OF SUPPLY AIR

The invention relates to an air-conditioning system for use in aircraft in accordance with the preamble of claim 1.

Figure 1:
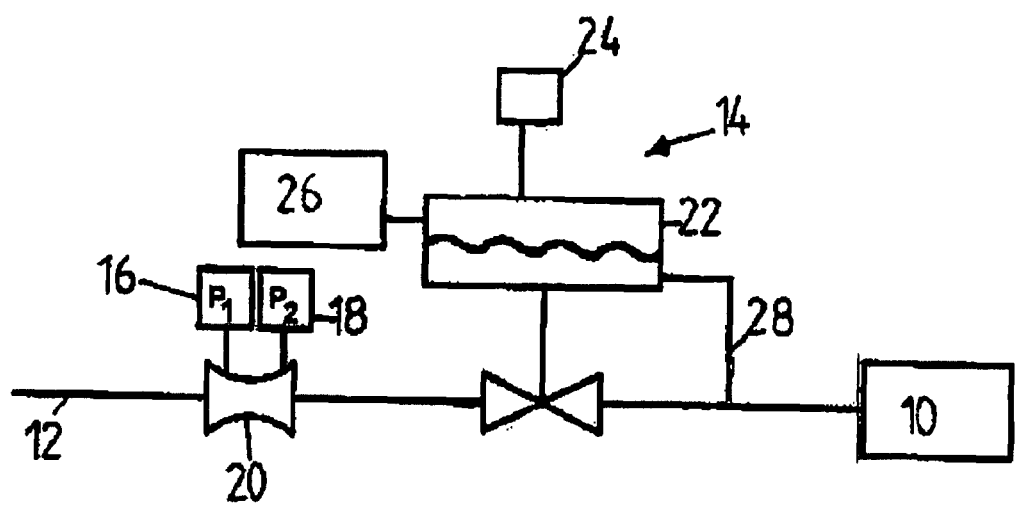

A part of such an air-conditioning system in accordance with the prior art is shown in the enclosed FIG. 1. A so-called pack is designated by 10 there in which the air is processed before the introduction into the cockpit of the aircraft or into the passenger cabin of the aircraft. The pack 10 is supplied with so-called bleed air which is bled from the engine. The bleed air is guided through a line 12 in this process. A valve 14 serves for the air flow control of the air fed to the pack. In accordance with the aforesaid prior art, the valve 14 has an electrical controller and additionally a pneumatic controller. In accordance with FIG. 1, the electrical controller receives the signals from two pressure sensors 16 and 18 which serve the reception of a pressure P1 and of a pressure P2 in a Venturi nozzle 20 provided in the air line 12. The activation pressure of a pressure membrane 22 is controlled in accordance with the received pressure signals in a known manner via a torque motor 24 acting on the pressure membrane such that the flap unit of the valve, not shown in any more detail here in FIG. 1, is set in response to the control value. 26 designates a solenoid for switching the valve 14 on or off. If the electrical control should malfunction, for example due to a failure of the electrics, a pneumatic controller is additionally realized in the valve 14. It is shown symbolically in FIG. 1 by the pressure return line 28.

In standard operation, the air flow control takes place exclusively through the electrical part of the valve 14. If this fails, a pneumatic control takes the place of the electrical control through the pressure control part 28 of the valve 14. The failure rate of the valve is considerably increased over simple electrical flow control valves on the basis of this measure. It is nevertheless found in the use of such valves that the valve fails completely at infrequent, but statistically relevant intervals. One reason for this can lie in the fact that both the electrical control and the pressure control each act on an actuator unit and a flap unit. If therefore, for example, the pressure membrane 22 should fail as the actuator unit or if the flap unit should fail, the total pack 10 can no longer be supplied with air to the desired degree and fails completely.

It is now proposed in US 2004/0177639 A1 to double the valves, i.e. to provide two electrical flow control valves provided independently of one another. This embodiment is not only expensive, but also large in construction size and increases the total weight of the air-conditioning system, which is of a great disadvantage in aircraft construction.

It is the object of the present invention to ensure the availability of an air-conditioning system in a manner which is as cost effective as possible with a weight of the total system which is as low as possible.

This object is solved in accordance with the invention by the combination of the features of claim 1. Accordingly, an air-conditioning system is provided with a redundant feed of supply air comprising at least one pack which is supplied with air, with at least one valve being arranged in the feed for the air flow control. An electrical flow control valve and a pneumatic flow control valve is arranged there for the air flow control in parallel connection in front of the pack. In accordance with the solution in accordance with the invention, two lines are provided which run in parallel and have separate valves with separate actuator units and flap units. The total availability of the system can hereby be greatly improved since a so-called "common mode" failure is no longer present. In the electrical control mode of the electrical flow control valve usually used for the control, a continuous feedback of the air flow is ensured by the air flow measurement in the Venturi nozzle present in the air line. On a failure of the electrical flow control valve, the correspondingly associated valve is closed and a pneumatic control by the pneumatic flow rate control valve takes place. A corresponding control therefore takes place here which is independent of the electric supply.

Preferred configurations of the invention result from the dependent claims following on from the main claim. Accordingly, two packs can be provided in accordance with a preferred configuration which each have the parallel arrangement in accordance with the invention of the electrical flow control valve and of the pneumatic flow control valve.

In accordance with a further preferred configuration of the invention, an air treatment device can be arranged in front of the pack. This air treatment device can be an ozone converter. A device for the elimination of volatile organic compounds can also be provided as an air treatment device. These volatile organic compounds, for example kerosene, produce air pollution, with this device serving to eliminate them. The device for the elimination of the volatile organic compounds can be provided separately as an air treatment device. Alternatively, it can also be integrated in the ozone converter.

In accordance with an embodiment variant of the invention, the air feed line for the pneumatic flow control valve can be led past the air treatment device.

Another embodiment variant of the invention contains the fact that the air feed line for the pneumatic flow valve branches off after the air treatment device in the flow direction.

The pneumatic flow control valve can advantageously control the air flow to a previously fixed pressure level in response to the flow resistance of the pack.

Figure 2:
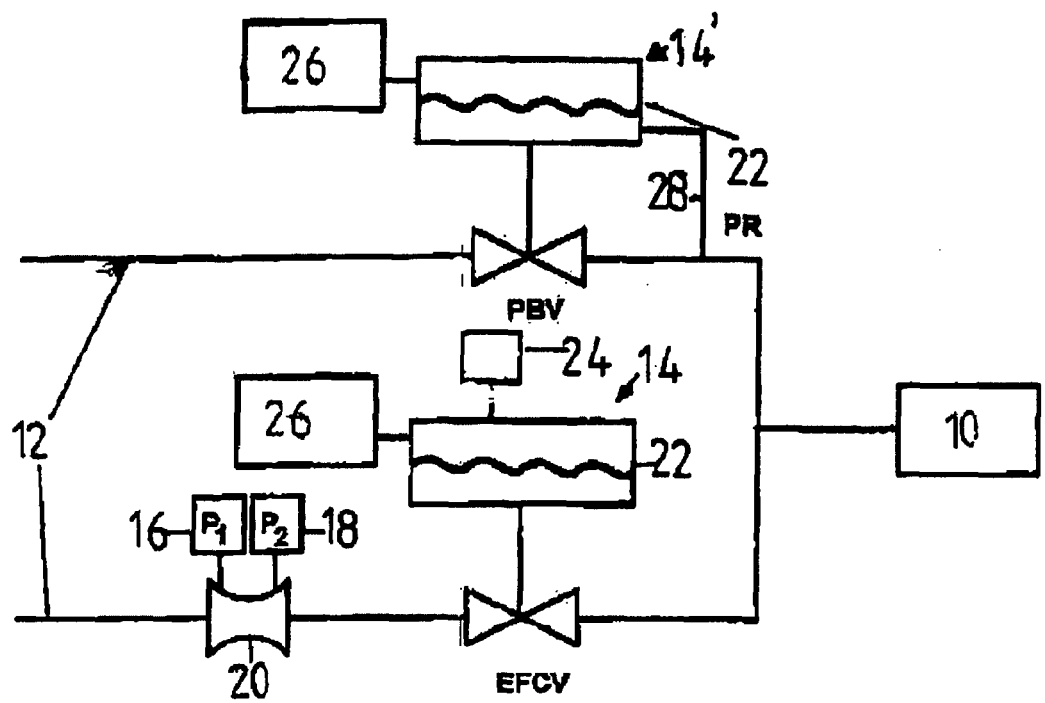
Figure 3:
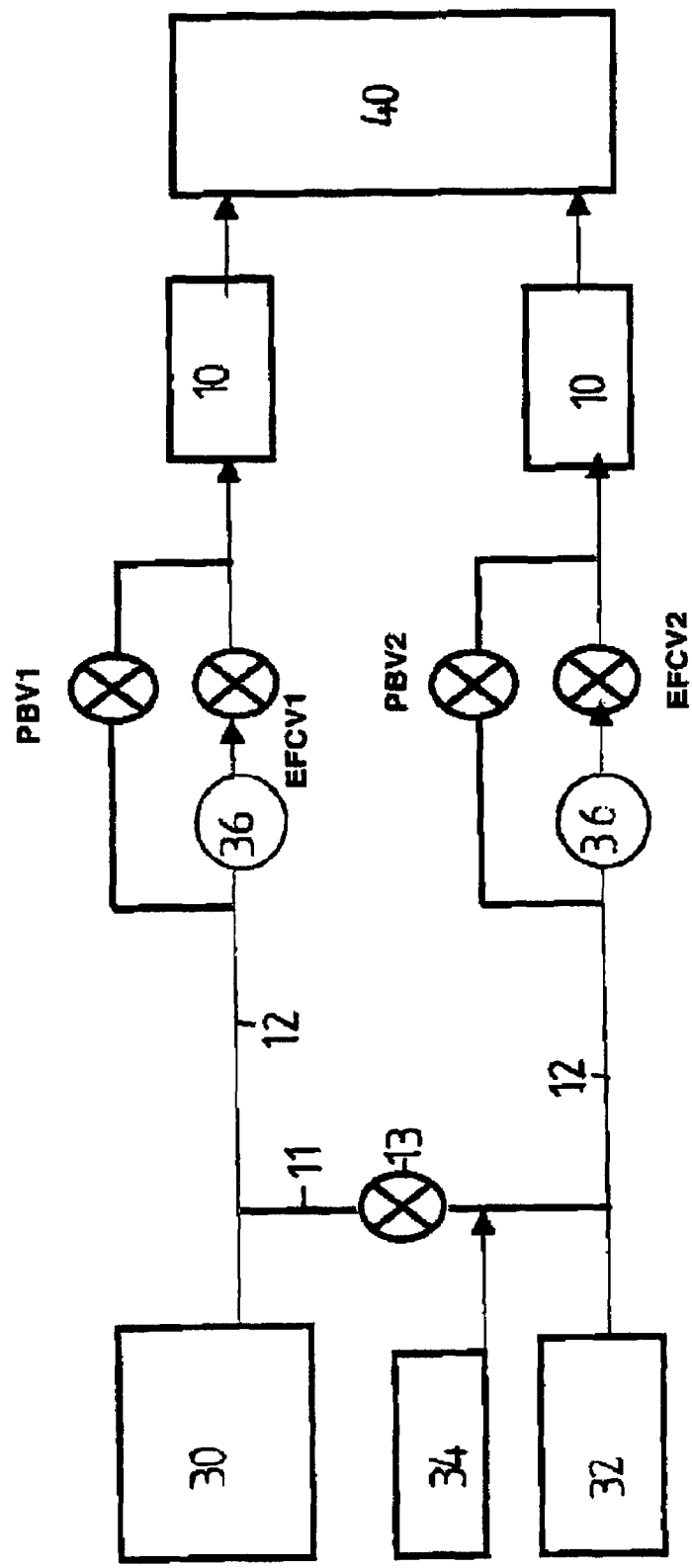

Further details and advantages of the invention will be explained in more detail with reference to an embodiment shown in the drawing. There are shown:

FIG. 1: a schematic system scheme in accordance with the prior art;

FIG. 2: a schematic system scheme in accordance with a first embodiment of the present invention; and FIG. 3: a schematic representation of a total system in which an embodiment of the invention has been integrated.

In FIG. 2, a system of a part of the air-conditioning system is shown schematically in which two parallel bleed air lines 12 each have control valves 14 and 14' respectively. The control valve 14 is an electrical flow control valve EFCV of standard construction. Here, a Venturi nozzle 20 is in the bleed air line with a first pressure sensor 16 for the pick-up of the pressure P1 and a second pressure sensor 18 for the pick-up of the pressure P2 to make a continuous flow measurement possible here. The pressure controlling the pressure membrane 22 is set via the torque motor 24 in response to this continuous flow measurement. The flap unit of the valve (not shown here) is set via the pressure membrane 22. If the electrical flow control valve EFCV fails, the flap unit is closed. The pneumatic flow control valve is simultaneously opened. Just like the electrical flow control valve, it has an actuator unit and a flap unit. A pressure membrane also serves as an actuator here, which is, however, pneumatically controlled. This pneumatic control also takes place in a known manner by the control to a defined pressure level, with the air flow here resulting in response to the resistance of the pack 10.

An on/off solenoid is connected to both actuator units 22 and the respective control valve 14 or 14' can be activated or switched off respectively via it.

A total concept of a part of an aircraft air-conditioning system is shown in FIG. 3. Two bleed air systems 30 and 32 are provided here. The bleed air of the respective pack 10 is supplied via corresponding lines 12. 34 designates a so-called APU which serves ground air supply. The two air lines 12 are connected to one another via a connection line 11, with this connection line being able to be opened or closed via an X bleed air valve 13.

The air flow correspondingly treated in the pack is introduced into a common mixing chamber 40.

A respective electrical flow control valve and a respective pneumatic flow control valve are connected before the respective packs 10. As can further be seen from the system scheme in accordance with FIG. 3, a respective ozone conversion 36 is connected before the electrical flow control valve. In the normal case, the first pack 10 is supplied by means of the bleed air system 30, whereas the second pack 10 is supplied using the bleed air system 32. The X bleed air valve 13 remains closed. In contrast, the X bleed air system 13 is opened in the event that one of the bleed air systems 30 or 32 fails or that a switch is made by the APU unit 34 to so-called APU operation. In accordance with the system, two different operating modes are realized for the control of the air flow: an electrical operating mode and a pneumatic operating mode. These operating modes are realized in two different valves so that this control unit has a redundant structure.

The invention claimed is:

1. An aircraft system, comprising:
a first bleed air system supplying bleed air to a first pack via a first line;
a second bleed air system supplying bleed air to a second pack via a second line;
a connection line coupled between the first line and the second line, the connection line including a bleed air valve;
a common mixing chamber receiving air treated by the first and second packs;
a first redundant valve system coupled in the first line downstream of the connection line and upstream of the first pack, the first redundant valve system including a first electrical flow control valve (EFCV), which only provides electrical flow control, and a first pneumatic flow control valve (PBV), which only provides pneumatic flow control, arranged for air flow control in a parallel connection, the EFCV comprising an electrically-controlled actuator unit and a flap unit which is set via a pressure membrane, and the PBV comprising a pneumatically-controlled actuator unit and a flap unit which is set via a pressure membrane; and
a second redundant valve system coupled in the second line downstream of the connection line and upstream of the second pack, the second redundant valve system including a second EFCV, which only provides electrical flow control, and a second PBV, which only provides pneumatic flow control, arranged for air flow control in a parallel connection,
wherein if the EFCV fails, the flap unit of the EFCV is closed and the PBV is opened.

2. The aircraft system of claim 1, further comprising an auxiliary power unit (APU) configured to switch the bleed air valve, where the APU provides ground air supply.

3. The aircraft system of claim 2, wherein air flow for the packs is controlled by the first and second electrical flow control valves (EFCVs) in operation.

4. The aircraft system of claim 3, wherein on a failure of the first electrical flow control valve (EFCV), a solenoid connected to the first pneumatic flow control valve (PBV) activates the first PBV, the air flow for the first pack being controlled by the first PBV.

5. The aircraft system of claim 1, wherein the first and second PBVs are actuated pneumatically.

6. The aircraft system of claim 5, wherein the first and second PBVs are each actuated by a pneumatically-controlled pressure membrane.

7. The aircraft system in accordance with claim 4, wherein the air flow through the first and second electrical flow control valves (EFCVs) can be measured continuously via pressure measurements in a Venturi nozzle provided in a line of the aircraft system.

8. The aircraft system in accordance with claim 7, wherein an air treatment device is connected in front of each electrical flow control valve (EFCV).

9. The aircraft system in accordance with claim 8, wherein the air treatment device is an ozone converter.

10. The aircraft system in accordance with claim 8, wherein the air treatment device is a device for the elimination of volatile organic compounds.

11. The aircraft system in accordance with claim 8, wherein an air feed line for each pneumatic flow control valve (PBV) is led past the air treatment device connected in front of the electrical flow control valve (EFCV) that is arranged in parallel with that PBV.

12. The aircraft system in accordance with claim 11, wherein the air feed line for each pneumatic flow control valve (PBV) branches off after the air treatment device connected in front of the electrical flow control valve (EFCV) that is arranged in parallel with that PBV in the flow direction.

13. The aircraft system in accordance with claim 1, wherein each pneumatic flow control valve (PBV) controls to a previously fixed pressure level in response to flow resistance of the pack that is downstream of that PBV.

* * * * *